Dec. 15, 1936.   B. B. FORTNEY   2,064,252
INCANDESCENT LAMP AND PROJECTION DEVICE
Original Filed July 30, 1932   2 Sheets-Sheet 1

INVENTOR.
BRADDUS B. FORTNEY,
BY
J. F. Basseches
his ATTORNEY

Dec. 15, 1936. B. B. FORTNEY 2,064,252
INCANDESCENT LAMP AND PROJECTION DEVICE
Original Filed July 30, 1932 2 Sheets-Sheet 2

INVENTOR.
BRAUDDUS B. FORTNEY,
BY
his ATTORNEY

Patented Dec. 15, 1936

2,064,252

UNITED STATES PATENT OFFICE 2,064,252

INCANDESCENT LAMP AND PROJECTION DEVICE

Brauddus Brock Fortney, Louisville, Ky.

Application July 30, 1932, Serial No. 626,783
Renewed October 10, 1935

2 Claims. (Cl. 240—41.3)

This invention relates to projection apparatus; more particularly, to projection apparatus for use in connection with headlights for highway, roadway and other forms of illumination.

My invention has for an object the provision of a projection device of utility for illumination in connection with headlights and more particularly utility in connection with my prior applications Serial No. 261,004 filed March 12, 1928, now Patent No. 1,883,359, Serial No. 335,875 filed January 29, 1929, now Patent No. 1,883,360 and Serial No. 335,876 filed January 29, 1929, now Patent No. 1,883,361 for Headlights for providing apparatus for projecting a converged beam. Still more particularly it is contemplated by my invention to provide a projection system having utility in my inventions disclosed in my aforementioned applications, serving as a means for providing a converging beam of light whereby it may be controlled in accordance with the projection system to provide maximum efficiency and illumination and enhance the qualities of my prior inventions so far as elimination of glare is concerned, and to provide a headlight whose rays are so controlled as to have proper road distribution and discernibility behind the source of illumination by an approaching observer.

Still further objects of my invention reside in the provision of an incandescent bulb or lamp useful in connection with a projection system for projecting a beam of light in a direction most valuable for illumination purposes and for increasing the efficiency of the incandescent element so far as the dimensional characteristics of the lamp are concerned.

Still further objects of my invention reside in the provision of a projection system in which the light from an incandescent source includes a reflective system, combined with directly projected rays from the incandescent source, with maximum rays of light projected without reflection and the reflected rays projected within a usable angle, with the minimum amount of reflection, to thereby provide a projection system of high efficiency.

Still further objects of my invention reside in the provision of a projection system and an incandescent lamp for use therewith in which the directly projected rays are utilized for maximum illumination and all normally uncontrolled or unreflected rays are utilized to the maximum efficiency for conservation of the intensity of light and for the provision of a projection system in which glare is reduced to the minimum by controlling the character of projected light rays.

To attain these objects and such further objects as appear herein or may be hereinafter pointed out, I make reference to the accompanying drawings forming a part hereof, in which Figure 1 is a sectional view in side elevation of my complete device in its preferred form;

Figure 1:
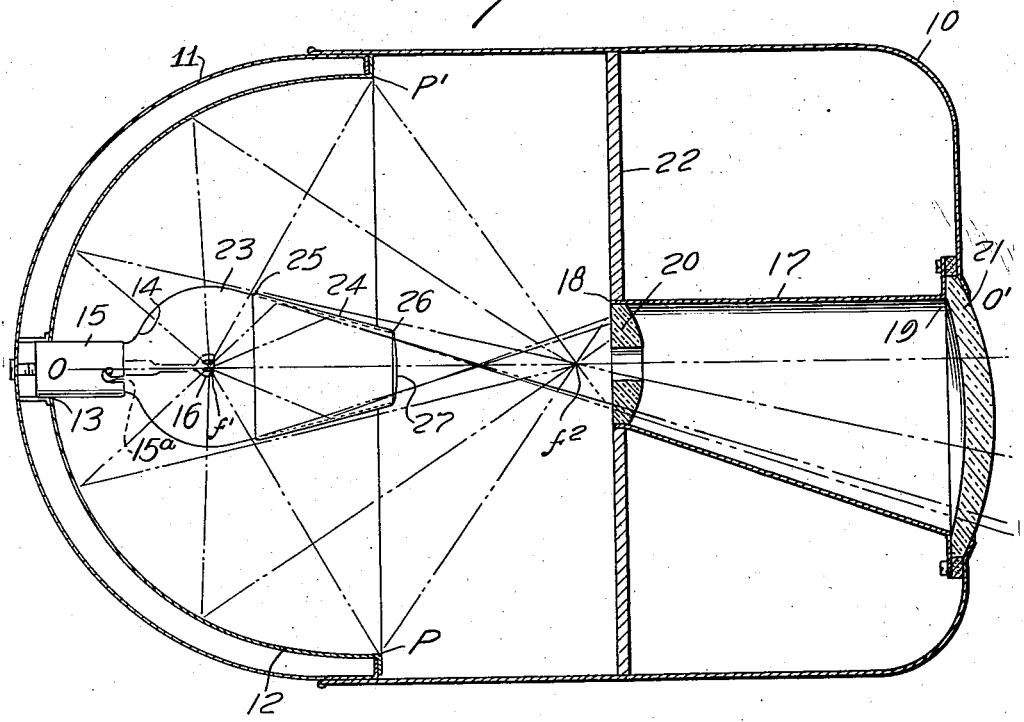

Making reference to the drawings, in the preferred form of my invention I provide a projection system in the form of a headlight 10, having a main housing 11. Interiorly disposed is a primary reflector 12, preferably of ellipsoidal configuration. At the optical axis of the reflector, through an orifice 13, there is disposed an incandescent bulb 14, the stem or base thereof 15a being located in the socket 15 which in turn is adapted to pass through the orifice 13. The incandescent bulb or lamp just described has a tightly coiled filament 16. The assembly is so constructed that the filament of the lamp is arranged to be disposed at the primary focus $f^1$ of the ellipsoidal reflector. The secondary focus $f^2$ of the ellipsoidal reflector is disposed to be within the housing 11.

Adjacent this secondary focus there is disposed a frusto-conical member 17, having its smaller opening 18 substantially concentric with the optical axis O—O' and its larger opening 19 substantially eccentric with the optical axis O—O'. In its preferred form it will be understood that the frusto-conical member 17 is preferably one in which the vertex thereof is preferably oblique to the optical axis.

Positioned at the mouth of the orifice 18, I provide a lens 20, preferably a plano-convexo lens of the character which will converge the rays projected thereon in a manner which will appear more clearly as this description proceeds. At the orifice 19, I position a second lens 21. This lens may also be of the plano-convexo type or one of the type carrying out the features embodied in my aforementioned application or that filed on even date herewith Serial No. 626,785.

The frusto-conical member 17 is supported within the housing 11 so that its outermost portion is suspended within the housing, whereas its innermost portion may be suspended upon an opaque wall. Preferably, however, a spider 22, formed of three radiating arms, is utilized.

The incandescent lamp 14, previously referred to, has its envelope formed from the base thereof, with a substantially spherical clear glass section 23. The frontal portion, disposed in front of the filament 16 is formed with a frusto-conical extension 24, with the base 25 adjacent the filament and the apex 26 disposed away from it. The walls of the frusto-conically formed section of the envelope are mirrored between the points 25 and 26, leaving the area 27 adjacent the apex clear. The mirrored section 24 previously referred to is disposed to receive the rays emitted from the incandescent filament which would not strike within the confines of the primary reflector 12 as outlined by the angle P$f'$P'. Thus the primary reflector 12 encompasses the major portion of the rays emitted by the incandescent source 16 within the usable angle and the mirrored section 24 formed on the frusto-conical portion of the envelope of the incandescent lamp serves to control any direct diverging rays outside the usable angle and which would fall within the angle P$f'$P' and ordinarily uncontrolled by the primary reflector 12.

The slope of the frusto-conical mirrored section formed on the envelope of the incandescent lamp is such as to reflect the rays in a direction away from the primary reflector 12 and to prevent any reflection backward upon the primary reflector. Preferably the slope of this mirrored section 24 formed on the frusto-conical section of the envelope is such as to converge the reflected rays through the clear section 27 of the envelope and adjacent the point in the focal area $f^2$. The preferred slope of the frusto-conically formed section 24 of the envelope above referred to is a cone formed by drawing a line from the focal point $f^2$ substantially tangent to the spherical portion 23 of the lamp 14.

The size of the clear portion 27 is preferably such that directly projected rays from the light source are confined to within limited small angles such as the area of the lens 20 in the embodiment referred to in Figure 1.

It will be observed that the frusto-conical section 24 above described, will, under certain conditions, converge the rays reflected from the mirrored surface thereof at a point between the primary focus $f^1$ and $f^2$. However, this, for certain purposes contemplated by me, is desirable in that a more diffused beam is impinged upon the lens 20 adjacent the focal area.

The rays projected beyond the lens 20 will proceed outwardly to the frusto-conical reflector 17 below the optical axis O—O', without modification. Those rays of light diverging above the optical axis will serve to be reflected downwardly below the optical axis upon impinging upon the upper surface of the conical reflector 17, which upper interior surface substantially entirely above the optical axis, is formed internally with a mirrored reflective surface.

The modification of the beam beyond this point is in accordance with my aforementioned pending applications and the emission of the beam through the lens 21 is dependent upon the character of the lens positioned at that point.

It will thus be observed that the character of light projected upon the lens 20 includes the concentrated light emitted from the source 16 and obtained for substantially the major spherical angle by conversion to the point adjacent the focal area $f^2$. A portion of the light emitted is directly projected upon the aperture 18, at which point the lens 20 is positioned and also includes a portion forwardly projected adjacent this point by reflection from the frusto-conically formed reflective surface 24 formed on the envelope of the incandescent lamp.

The form of the frusto-conically formed mirrored section 24 formed preferably upon the envelope of the incandescent lamp and from the bulb itself, permits of projection of light from the primary reflector 12, with maximum effectiveness in that the mirrored portion formed on the envelope of the incandescent lamp does not in any way interfere with the usable beam and no stray reflection occurs from the outer walls of the bulb. The arrangement of the parts as described prevents the diffusion and loss of light from the source 16, which would ordinarily strike the primary reflector 12, and assuring that all forwardly projecting rays which would fall outside the focal area are forwardly projected to within the region about the optical axis encompassed by the lens 20. Furthermore, all forwardly projected rays are transmitted with minimum losses due to internal reflection.

Figure 6:
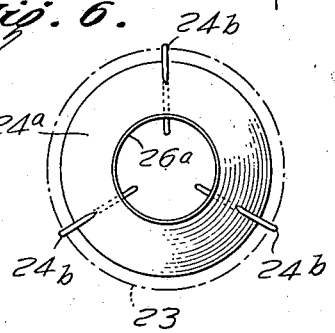
Figure 6 is a front elevation thereof.

In Figure 6 the incandescent lamp itself has been disclosed. In this construction, I use an incandescent bulb 23a of spherical or slightly ellipsoidal contour. Mounted upon the forward portion of the envelope 23a and positioned to be concentric with the longitudinal axis O—O' passing through the base 15a, there is provided a frusto-conical sleeve 24a, held in this position by straps 24b, the opposite ends of which straps are soldered to the base 15a and the sleeve 24a to rigidly hold the sleeve 24a in position. The slope of the frusto-conical sleeve 24a is substantially identical with the portion 24 of the embodiment previously described and the enlarged end 25a engages the bulb 23a and the small end 26a is open at 27a or formed with a lens in accordance with an embodiment to be hereinafter described.

It will be understood that the sleeve 24a has its internal surface formed with a mirrored reflective surface.

Figure 3:
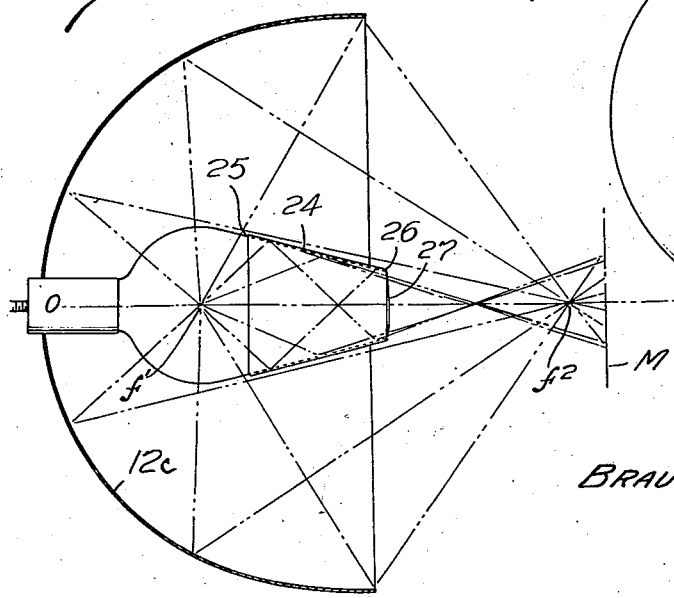
Figure 3 is an enlarged detail of the projecting and converging system.
Figure 2:
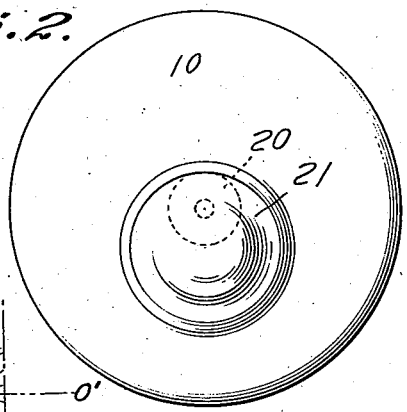
Figure 2 is a front elevation of Figure 1.

The embodiment just described may be substituted for the incandescent lamp 14 previously described, in connection with the combination illustrated in Figure 1. However, either of the lamps or their assembly comprising the frusto-conical member may be used with the projection systems of my prior applications first enumerated or with open face headlights and reflectors as in an assembly shown in Figure 3. In this assembly the reflector 12c may be an ellipsoidal reflector where used in a general assembly as in the preferred use described, or it may be other forms of reflectors such as a parabolic reflector, spherical reflector, or combinations thereof, and other surfaces of reflective character known in the industries for illumination purposes in headlight projection systems, or optical projection systems of all kinds, such as for home moving picture machines, etc. In such embodiments as shown in Figure 3, the beam of light is converged adjacent the focal area $f^2$ of a film M or the objective of a lens system of such projection system.

Where the reflector 12c is a parabolic reflector for transmitting a substantially parallel beam of light, the beam along the axial line O—O' will be intensified for distant illumination with minimum amount of rays uncontrolled for such light as would not directly impinge upon the reflector 12c.

Figure 4:
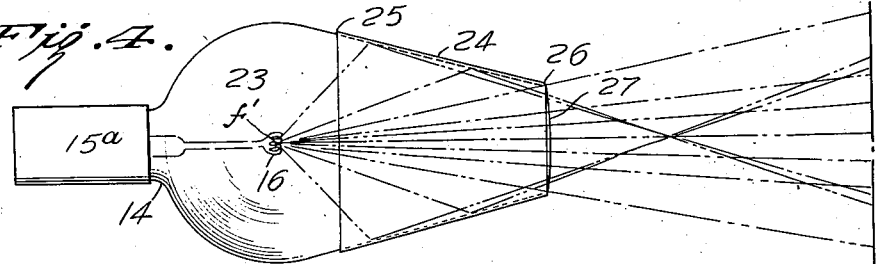
Figure 4 is an enlarged detail of an incandescent bulb.
Figure 5:
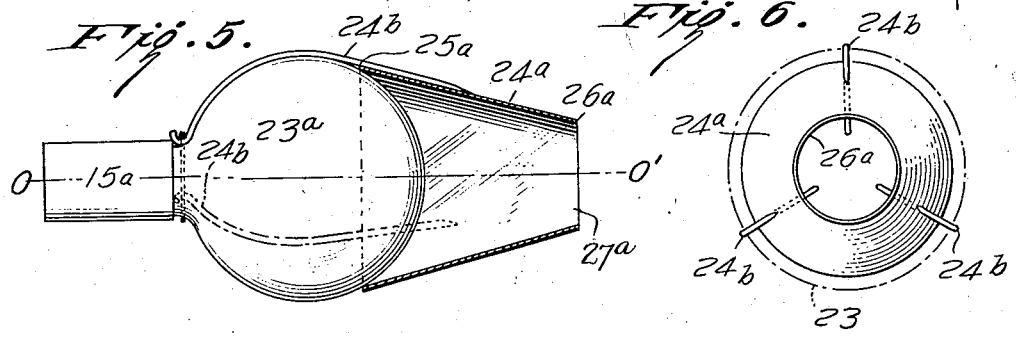
Figure 5 is an enlarged detail of another embodiment of my invention.

The incandescent lamp illustrated in detail in Figure 4 and now just described in referring to Figure 6 may be used in the combination shown in Figure 1, with the utility attributed to this combined assembly or may be utilized with the standard form of headlight of the general parabolic type, with considerable effectiveness. In such assembly, the embodiment just described and illustrated in Figure 6 is positioned within the normal socket provided in the headlight so that the filament 16 is positioned at the focal point of this reflector, permitting the clear portion of the envelope of the lamp to transmit the major portion of the light from the filament rearwardly upon the primary or parabolic reflector where this is used. Those rays which do not impinge upon the primary or the main parabolic reflector are encompassed by the frusto-conical reflector either formed upon the incandescent bulb or envelope as in the embodiment shown in Figure 4 or upon the sleeve 24a, in accordance with the embodiment shown in Figure 6.

Thus only a small portion of the rays directly emitted and immediately surrounding the optical axis will be uncontrolled and projected through the clear portion 27a, while the rapidly diverging rays normally directly emitted will fall upon the frusto-conically formed mirrored surface 24 or 24a, in the respective embodiments referred to.

In such form of construction, a light beam will be projected in which an exceedingly intense beam will be projected adjacent the optical axis of the system in a definite and controlled manner, without any dispersed effect, making the beam exceedingly useful for distant illumination.

Figure 7:
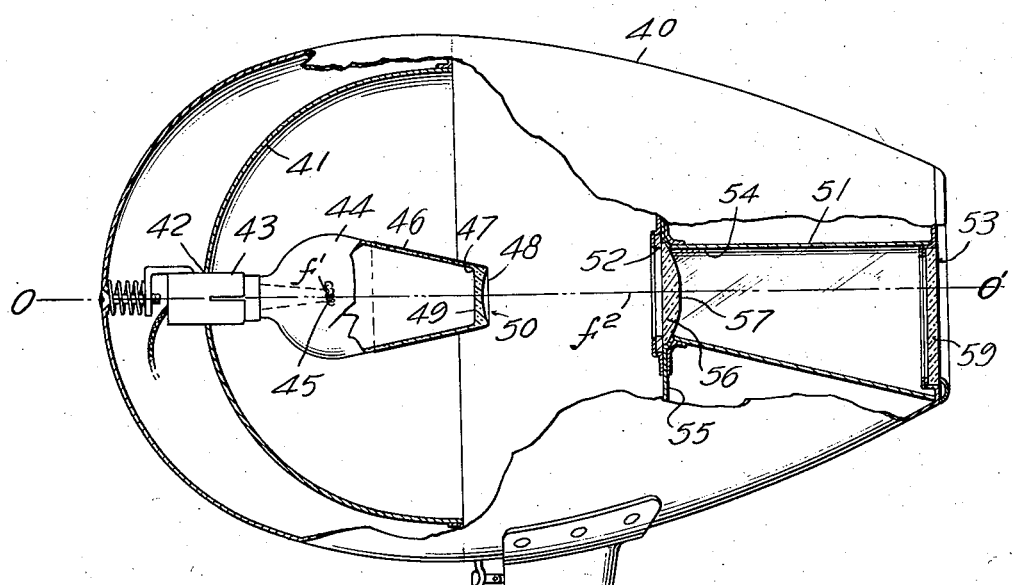
Figure 7 is a longitudinal sectional view of another embodiment of my invention.

In Figure 7 I have illustrated a still further embodiment of my invention, in which I show a headlight comprising a housing 40, within which is mounted a primary reflector 41, preferably of ellipsoidal character, or a distorted paraboloid arranged to converge the light impinged upon it at a focal area within the headlight. The reflector 41 is formed with an orifice 42, through which extends the socket 43, of an incandescent bulb 44. The filament 45 is preferably of the closely wound type and is arranged to operate preferably within a gas filled atmosphere. The filament 45 is disposed at the primary focus $f'$ of the reflector 41, the secondary focus being at the point $f^2$ within the headlight.

Mounted upon the envelope of the incandescent bulb 44 is a frusto-conical sleeve 46, formed interiorly thereof with a mirrored reflective surface. The frusto-conical sleeve 46 is positioned in the assembly just described and is of a slope substantially in accordance with the embodiments previously referred to and this may be either integral with the envelope of the incandescent bulb 44, in which event the glass is silvered to have the interior of the sleeve mirrored, or it may be mounted exteriorly of a spherical or slightly ellipsoidal bulb, in accordance with the construction illustrated in Fig. 6. In this embodiment, however, I prefer to mount at the restricted opening 47, a lens 48. This lens has its central portion formed with a plano-plano section 49. The remainder of the lens to the edges of the sleeve in which it is mounted and concentrically with the center 49 is plano-concavo 50, serving to diverge the rays impinged directly upon it from the filament 45 or that emitted by reflection from the reflected walls of the frusto-conical sleeve 46. The curvature of the plano-concave lens is such to substantially render the rays emitted nearer to parallelism or to a converging point adjacent the focal plane $f^2$. At this point I position a frusto-conical reflective conduit 51. The small end 52 of the frusto-conical reflective conduit 51 is positioned substantially concentric with the optical axis O—O'. The enlarged end opening 53 is substantially eccentric with the optical axis O—O'. The upper interior surface 54 for substantially the entire portion above the optical axis is formed with a mirrored reflective surface interiorly thereof.

The frusto-conical reflective conduit 51 is supported within the housing at its small end by an opaque partition member 55. However, this may be a spider. The remainder of the housing may be constructed to conform to the opening 53 and thereby serve to support this end of the frusto-conical reflective conduit. At the restricted opening 52 of the frusto-conical reflective conduit 51 there is positioned a lens 56. This lens may be of the plano-convex type. Preferably, however, it is one which is formed with a plano-plano center 57, the opening being slightly larger than the plano-plano center 49 of the first lens 47 aforementioned. The convex portions thereof may, however, be ground in accordance with the preferred embodiment of this lens, as disclosed in my copending application Serial No. 626,785 for a lens construction filed on equal date herewith.

The enlarged opening of the conical reflective conduit 51 is provided with a lens 59. This may also be of the plano-convex type or may be formed with a plano-plano center and with refractive diverging prisms in accordance with predetermined desired road distributing characteristics.

By the construction described, it will be observed that concentrically with the optical axis, an extremely intense beam will be projected which is definitely controlled and that substantially the entire spherical angle of the light emanating from the filament 45 will be otherwise forwardly projected adjacent the focal plane $f^2$ for projection into the conical reflective conduit 51, in accordance with the principles and for the desirable purposes referred to in my aforementioned prior filed applications.

Thus, by my invention, maximum intensity of light is obtained, with definite control. Also internal reflection of the projection system is avoided preventing any uncontrolled rays from being projected due to aberrational effects and increasing the efficiency of the system.

Having thus described my invention and illustrated its use, what I claim as new and desire to secure by Letters Patent, is—

1. An incandescent lamp for light projection, comprising an elongated envelope encompassing a filament, said envelope being formed with clear sections adjacent the optical axis and surrounding the major spherical angle about said filament up to a mirror portion forwardly thereof, the portion of said envelope intermediate to said clear sections being formed with a concentrically arranged mirrored, reflective surface disposed at an acute angle forwardly directing the rays emanated from said filament and impinging on said reflective surface.

2. In a light projection apparatus, including a housing and a primary condensing reflector adapted to converge the major portion of the light rays within the housing, an incandescent lamp comprising an elongated envelope encompassing a filament and arranged axially to the optical axis, said envelope being formed with clear sections adjacent the optical axis and surrounding the major spherical angle about said filament up to a mirrored portion forwardly thereof, the portion of said envelope intermediate to said clear sections being formed with a concentrically arranged mirrored reflective surface disposed at an acute angle forwardly directing the rays emanating from the filament and impinging on said reflective surface.

BRAUDDUS BROCK FORTNEY.